Dec. 19, 1933.  H. R. GROSS  1,940,348
SPOTLIGHT MOUNTING
Filed Feb. 3, 1933
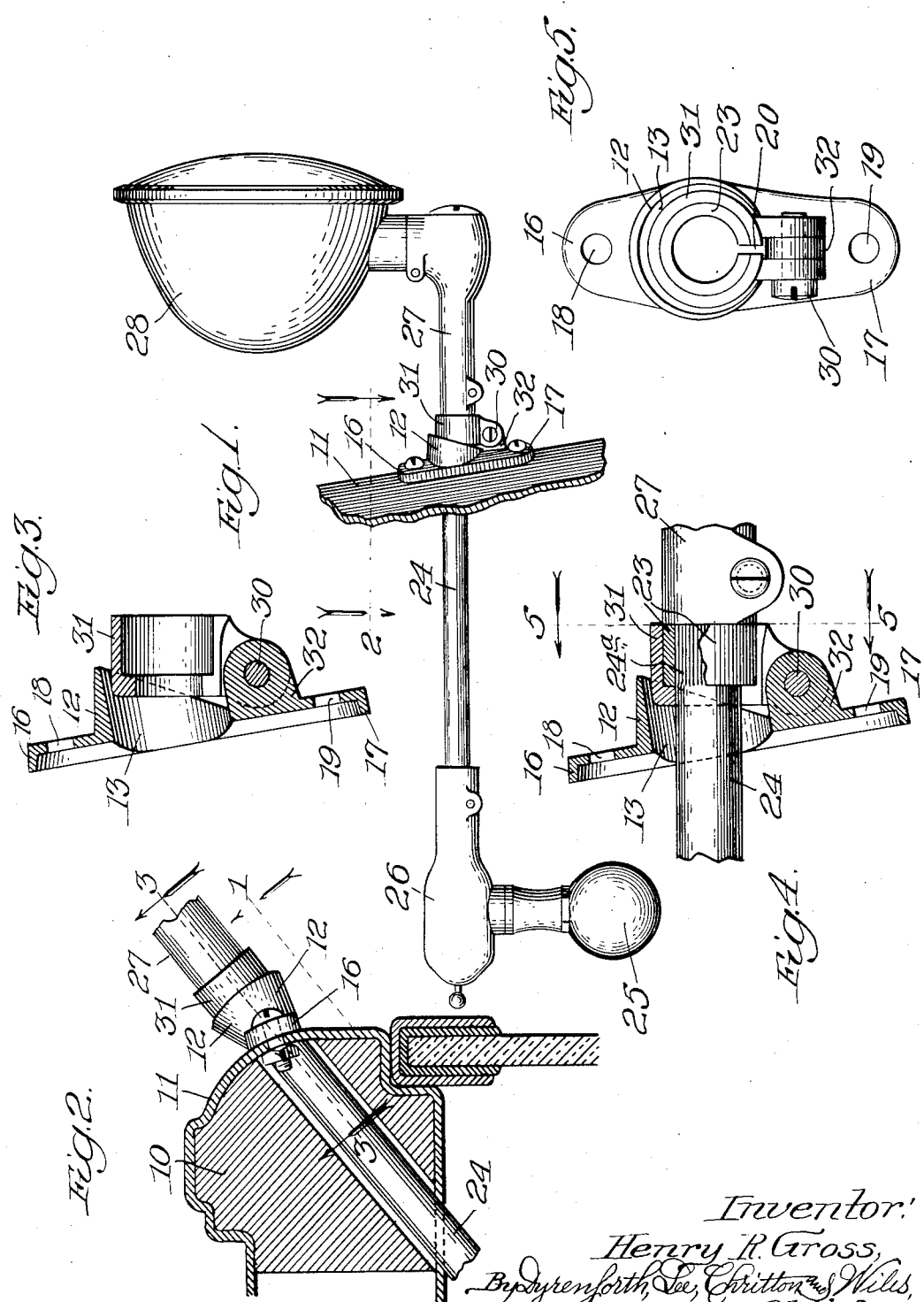
Inventor:
Henry R. Gross,
By Dyrenforth, Lee, Chritton and Wiles,
Attys.

Patented Dec. 19, 1933

1,940,348

UNITED STATES PATENT OFFICE 1,940,348

SPOTLIGHT MOUNTING

Henry R. Gross, Chicago, Ill.

Application February 3, 1933. Serial No. 655,087

2 Claims. (Cl. 240—61.13)

This invention relates to improvements in spotlight mountings and is especially applicable to dirigible or adjustable spotlights adapted for use on vehicles, for example, motor vehicles. My invention may be employed, for example, in mounting a spotlight similar in construction and operation to the spotlight shown in my United States patent, No. 1,702,772, issued February 19, 1929.

Among the features of my invention is the provision of a bracket having means for attaching the same to a support, for example, the corner post of a motor vehicle. Pivotally attached to the bracket is a hollow clamp adapted to receive and hold an elongated member, for example, a hollow guide or tube in which the spotlight is mounted.

By the use of my invention, the mounting of a spotlight of the character referred to is greatly facilitated and the accuracy of its position is insured. The invention is of especial value in connection with the mounting of a spotlight on a slanting corner post, that is, a corner post which is not vertical. In mounting spotlights on such posts, difficulty has been encountered heretofore in making the hollow guide horizontal. The horizontal adjustment of the hollow guide is very easily accomplished in the practice of my invention.

In general, it may be stated that my invention includes a bracket with an enlarged hole therethrough which has means for attaching the same to the corner post of a motor vehicle. A hollow clamp is pivotally attached to the bracket on a substantially horizontal pivot so that the hollow guide, when clamped in said clamp and extending through the enlarged hole in the bracket, may be readily adjusted to horizontal position, even though the bracket is mounted on a slanting corner.

Other features and advantages of my invention will appear more fully as I proceed with my specification.

In that form of device embodying the features of my invention shown in the accompanying drawing—

Figure 1 is a view in front elevation of a spotlight mounted in accordance with my invention; Fig. 2 is a horizontal sectional view taken through the corner post of a vehicle; Fig. 3 is a view taken as indicated by the line 3 of Fig. 2; Fig. 4 is a view similar to Fig. 3 showing the spotlight in place; and Fig. 5 is a view taken as indicated by the line 5 of Fig. 4.

As shown in the drawing, 10 may indicate the corner post of a motor vehicle and 11, a portion of the sheet metal body or lining. 12 indicates a bracket with an enlarged hole 13 therein. Pivotally attached to this bracket on the horizontal pivot pin 30 is a hollow clamp 31. Means are provided for attaching the bracket 12 to a support, for example, a corner post of a motor vehicle. As here shown, such means include the ears 16 and 17 with the screw holes 18 and 19. The split in the clamp 31 is indicated by 20 and the adjacent faces are adapted to be drawn together by tightening the pivot pin 30. That is, tightening the pivot pin 30 serves to contract the clamp 31 and also to lock it against pivotal movement on the bracket 12. As here shown, the pivotal attachment of the clamp 31 on the bracket is accomplished by providing a lug 32 on the lower ear 17 of the bracket through which the pivot pin 30 extends.

In mounting the spotlight, the bracket 12 is preferably first attached in proper position to the slanting corner post 10. A suitable hole may then be bored through the corner post by any suitable means. This hole is preferably made as nearly horizontal as possible and somewhat larger than the tubular guide to be inserted therethrough so that if the hole is not exactly horizontal, the guide may still be adjusted to a horizontal position by swinging of the clamp 31 on the pivot pin 30. If the hole in the corner post is made large enough, this swinging is permitted. It is to be understood that the hole in the bracket 12 is large enough to permit such swinging adjustment to place the tubular guide in horizontal position.

24 indicates the hollow guide which is then placed in the clamp 31 and extended through the hole in the corner post. This guide is preferably milled, roughened or knurled, as indicated by 24ª, where the same lies inside of the split collar 23, hereinafter described. 23 indicates a split collar preferably placed inside of the clamp 31 and surrounding the tubular guide 24.

After the parts are placed as described, the pivot screw 30 is tightened to contract the clamp 31 and split collar 23 to firmly grip and hold the hollow guide 24. It is to be understood that before thus tightening the pivot screw, the tubular guide 24 is adjusted to horizontal position by rocking the clamp on the pivot.

The spotlight is mounted in the hollow guide 24 in the same general manner as shown in my earlier patent, referred to above, and, consequently, further details are not necessary. In general, it may be stated that the guide 24 here shown corresponds to the tubular guide 13 of such earlier patent. It is to be understood, also, that the general details of construction and operation of the spot light, as here shown, may be similar to those of the spotlight of my earlier patent. For example, such spotlight may include a handle 25, corresponding to the handle 11, a handle support 26, corresponding to the handle support 20, a lamp support 27, corresponding to the lamp support 21, and a light 28, corresponding to the light 12.

While I have shown and described a certain embodiment of my invention, it is to be understood that it is capable of many modifications. Changes, therefore, in the construction and arrangement may be made without departing from the spirit and scope of the invention as disclosed in the appended claims.

What I regard as new, and desire to secure by Letters Patent, is:

1. A spotlight mounting, including; a bracket with an enlarged hole therethrough; means for attaching said bracket in an inclined position to a corner post of a motor vehicle; a hollow clamp pivotally attached to one end portion of the bracket and provided with a hole of smaller diameter than the hole of the bracket and in registry therewith to receive and clamp an elongated rigid light-supporting member which extends through both holes and which may be readily adjusted to substantially horizontal position.

2. A spotlight mounting as claimed in claim 1, in which the clamp is pivotally attached to the bracket by a pivot screw, tightening of said screw serving to lock the clamp against pivotal movement and contract the same.

HENRY R. GROSS.